UNITED STATES PATENT OFFICE.

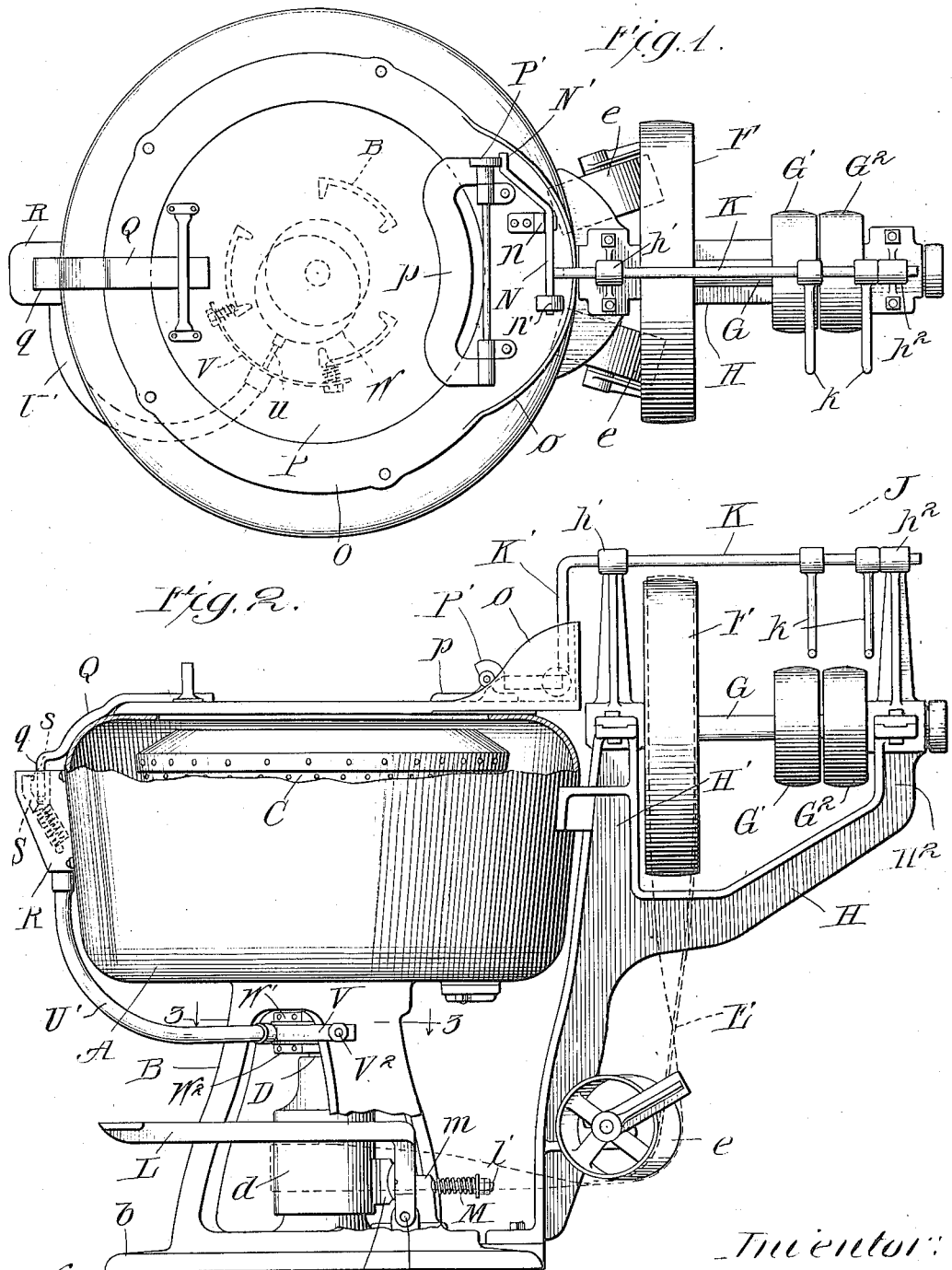

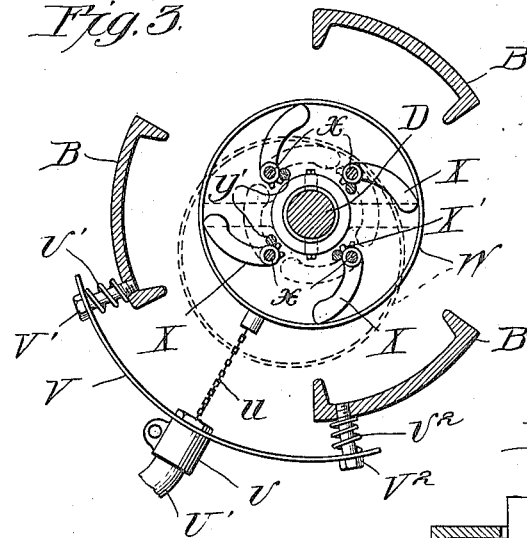
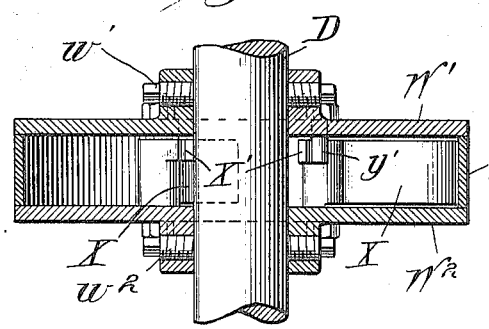
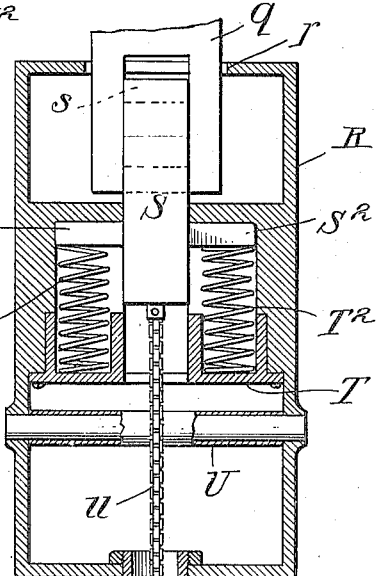
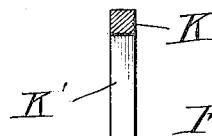

FRITZ BALZER, OF CHICAGO, ILLINOIS, ASSIGNOR TO TROY LAUNDRY MACHINERY COMPANY, LTD., A CORPORATION OF NEW YORK.

CENTRIFUGAL EXTRACTOR.

1,152,266.      Specification of Letters Patent.      Patented Aug. 31, 1915.

Application filed April 5, 1912. Serial No. 688,618.

*To all whom it may concern:*

Be it known that I, FRITZ BALZER, a subject of the Emperor of Germany, residing at Chicago, in the county of Cook and State of Illinois, have invented certain new and useful Improvements in Centrifugal Extractors, of which the following is a specification.

My invention relates in general to laundry machinery, and more particularly to centrifugal extractors.

In order that the rapidly revolving basket of a centrifugal extractor may be prevented from injuring the operator, interlocking or connecting mechanism between the power controller and the extractor cover have been provided, which either automatically cut off the driving power when the cover is opened, or prevent the opening of the cover until after the controller has been actuated to discontinue the driving power. Such devices are, however, open to the serious objection that they afford no protection while the basket continues to revolve by momentum after the driving power has been disconnected, as the cover may then be raised and afford an opportunity for the operator to carelessly place his or her hands in the extractor with the resulting danger of injury.

The primary object of my invention is to provide a centrifugal extractor in which the cover will be automatically securely locked in closed position until the speed of the basket has been so reduced as to avoid any danger of injury to the operator.

A further object of my invention is to provide a centrifugal extractor in which the driving power cannot be applied to rotate the basket until the cover is closed, and in which the cover will be automatically locked in closed position as long as the basket continues to revolve at a speed which would endanger the operator should access be permitted to the basket.

My invention will be more fully disclosed hereinafter with reference to the accompanying drawings, in which the same is illustrated as embodied in a convenient and practical form, and in which—

Figure 1 is a plan view; Fig. 2, a side elevational view, a portion of the casing being broken away; Fig. 3, a sectional view on line 3 3, Fig. 2; Fig. 4, an enlarged vertical detail section of a portion of the basket spindle and the centrifugally operated weights; Fig. 5, an enlarged detail section through the lock for the cover; and Fig. 6, an enlarged detail view of the interlocking connection between the cover and belt shifter.

The same reference characters are used to designate the same parts in the several figures of the drawings.

A indicates the casing, or curb, of the extractor which is provided with a supporting base B having a platform $b$ at the bottom thereof, which may be secured to the floor.

C designates the perforated basket within the casing A which is adapted to receive the articles from which the water is to be extracted.

D designates a shaft which is suitably connected to the basket C to rotate the same.

$d$ indicates a pulley fixed upon the shaft D and around which passes a belt E. The belt E passes around idler pulleys $e$ and thence around a large pulley F fixed upon a counter-shaft G. A bracket H is secured to the casing A and is provided with diverging arms H' and H² in the ends of which the shaft G is journaled.

G' indicates a pulley fixed upon the shaft G, while G² indicates a pulley loosely mounted upon the shaft G.

J indicates the power belt which is adapted to be shifted from the loose pulley to the tight pulley, or vice versa, by suitable belt shifting means. I have shown in the drawings a belt shifting means comprising a rod K which is mounted to reciprocate in bearings $h'$ and $h^2$ projecting upwardly from the arms of the bracket H.

$k$ designates a pair of curved rods secured to the reciprocating rod K and engaging the opposite edges of the power belt J.

L designates a foot-operated brake lever which is pivotally connected at $l$ to the base B of the machine.

L' indicates the brake shoe which is adapted to engage the pulley $d$ intermediate of the two sides of the belt E. The shoe L' is connected to a rod $l'$ which extends through the lever L and also through a bracket $m$ fixed upon the base of the machine. A spring M surrounds the rod $l'$ and is interposed between the bracket $m$ and a nut on the outer end of the rod $l'$, the tension of the spring being such as to normally hold the brake shoe out of contact with the pulley *d* and to be compressed by foot-power applied to the lever L and permit the brake shoe to engage the pulley.

O designates a circular plate surrounding the opening through the top of the casing A which is provided with a water guard *o*.

P designates a cover which is pivoted by a hinge *p* to the plate O and when closed prevents access to the interior of the casing and the basket inclosed therein.

The centrifugal extractor described does not in itself constitute my invention, but is illustrated and described in order that my invention may be fully disclosed. It will be obvious from the subsequent description that my invention is not limited in its application to a centrifugal extractor of the specific construction above described, but is capable of use in connection with other forms of centrifugal extractors, and similar machines.

P' designates a cam secured to, and preferably forming part of, the hinge portion *p* which is secured to the cover P, such cam being adapted to engage one end N' of a lever N fulcrumed intermediate of its ends upon a bracket *n* secured to the casing A. The opposite end of the lever N is provided with a counterbalance *n'* so as to normally oscillate the lever N to a position below the lower end of a downwardly extending portion K' of the belt shifting rod K. The position of the cam P' is such that when the cover P is lifted, it will engage the end N' of the lever N and oscillate the latter, so that it will be elevated into a position in the path of the lower end of the depending portion K' of the belt shifting rod K in a manner which will be more fully hereinafter described.

Q designates a hasp fixed to the cover and having a depending portion *q* having an opening therein adapted when the cover is closed to be projected through an opening *r* in the upper end of a latch casing R. The latch casing R is secured in any suitable manner to the outer surface of the extractor casing A and contains a reciprocating latch S having a hook *s* at its upper end adapted to engage the opening in the lower end *q* of the hasp Q. The latch S is provided with oppositely extending lugs S' and S² which are engaged by the upper ends of springs T' and T², respectively, the lower ends of such springs being supported upon a plate T removably secured within the latch casing R.

U designates a guide roller extending transversely beneath the latch S and journaled between the sides of the casing R.

*u* designates a flexible connection leading from the lower end of the latch S and passing around the guide roller U, and thence passing through a flexible tubular casing U'. One end of the tubular casing U' is secured by a suitable coupling *u'* to the bottom wall of the latch casing R, while the opposite end of the tubular casing U' is secured to a curved plate V by any suitable coupling *v*. The opposite ends of the curved plate V are provided with holes through which extends bolts V' and V², the latter being secured to adjacent legs B and B of the base which support the extractor. Springs *v'* and *v²* surround the bolts V' and V² and are interposed between the plate V and the respective legs B. The chain, or flexible cable, *u*, one end of which is secured to the latch S, after passing through the tube U', passes through a hole in the plate V registering with the tube, and is then connected with a circular band W, which is interposed between two disks W' and W² rigidly secured to the spindle D of the basket. In order that the disks W' and W² may be secured around the spindle D, they are preferably each made in semi-circular sections secured together, and each disk is secured to the spindle D by clamping screws *w'* and *w²* extending through the hubs of the disks into engagement with the spindle.

Located within the circular band W and interposed between the disks W' and W² are a series of weighted arms X, each of which is pivoted adjacent its inner end upon a vertical rod *x* supported at its ends by the disks W' and W². Each of the weighted levers X is provided with a lug X' adapted to engage a stop *y'* carried by one of the disks W' or W² when the lever is thrown outwardly by centrifugal force.

The operation of my improvements in centrifugal extractors, and the like, is as follows: Assuming that the belt shifter is in the position to locate the driving belt J on the loose pulley G²—as shown in Figs. 1 and 2—and that the cover P is raised, the articles from which the water is to be extracted are placed within the perforated basket C. When the cover is in its open position, the cam P' retains the lever N in position to overlie the lower end of the depending portion K' of the belt shifting rod, and hence prevents the belt from being shifted to the tight pulley. The cover P is then closed, which oscillates the cam P' away from the end N' of the lever N, and permits the weight *n'* to swing the lever downwardly below the lower end of the depending portion K' of the belt shifting rod. The rod K is then reciprocated toward the left in any convenient manner, as by grasping the depending portion K' thereof, thereby shifting the power belt J to the tight pulley G' and rotating the basket C through the medium of the belt E and pulleys F and *d*. As the basket acquires speed, the weighted levers X are thrown outwardly by centrifugal action, inasmuch as they are carried by the spindle D. The outward movement of the weighted levers moves the circular band W into a position concentrically around the spindle D, thereby exerting a pull upon the chain $u$, which draws the latch S downwardly against the tension of the springs T' and T². The downward movement of the latch S causes the hook $s$ on its upper end to engage within the opening in the lower end of the hasp Q, thereby securely locking the cover P in closed position. The cover continues to be locked in closed position as long as the spindle D, and with it the basket C, continues to be driven, and as long as it continues to rotate by momentum until its reduction in speed has been such that the centrifugal action upon the weighted levers X is less than the tension of the springs T' and T², at which time the tension of such springs forces upwardly the latch S out of engagement with the hasp Q and coincidentally moves the circular band W into the eccentric position shown in dotted lines in Fig. 3. The tension of the springs T' and T² is so related to the weighted levers X that the latch S will only be disengaged from the hasp Q when the speed of the basket has been so reduced that there is no danger of injury to the operator should he lift the cover P and insert his hands into the basket. After the power has been disconnected from the basket by shifting the rod K toward the right in Figs. 1 and 2, the rotation of the basket may be quickly stopped by applying pressure to the brake lever L, thereby securing the unlocking of the cover P, but should the operator fail to use the brake with sufficient force to practically stop the rotation of the basket, it will be impossible for him to raise the cover, and hence he will be automatically protected from injury. After the basket has practically ceased rotating and the latch has consequently been disengaged from the hasp, the cover may be lifted, which automatically oscillates the lever N into position to prevent the shifting of the belt to the tight pulley as long as the cover remains open.

From the foregoing description it will be observed that I have invented improvements in centrifugal extractors by means of which their operation is rendered at all times entirely safe as the cover is positively locked in closed position, not only during the connection of the driving power with the basket, but during the rotation of the basket by momentum after the discontinuance of the application of power to the basket. It will be further observed that it is impossible for the operator to apply driving power to the basket until the cover has first been closed, and that as soon as the basket has acquired a slight speed of rotation the cover will be positively locked closed and will be automatically retained in such locked position after the disconnection of the driving means from the basket and until the rotation of the basket has practically ceased. The hands of the operator cannot, therefore, be inserted in the extractor while the basket is rotated at such speed as to endanger the safety of the operator's hands.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient, and while in the annexed claims my invention is defined as relating to centrifugal extractors, yet I do not wish to be thereby understood as excluding the use of my invention for any analogous purpose for which it may be adapted.

I claim:

1. In a centrifugal extractor, the combination with a casing, of a cover for said casing, a rotating basket within said casing, means for rotating said basket, a housing secured to said casing, a latch inclosed by said housing, a hasp secured to said cover and adapted to enter said housing when said cover is closed, means for normally retaining said latch out of engagement with said hasp, and a latch controlling device actuated by said rotating means and connected with said latch to automatically move the same into engagement with said hasp continuously during the rotation of the basket.

2. In a centrifugal extractor, the combination with a casing, of a cover for said casing, a rotating basket within said casing, means for rotating said basket, a housing secured to said casing, a reciprocating latch inclosed by said housing, a hasp secured to said cover and adapted to enter said housing when the cover is closed, said latch and hasp having intersecting paths of movement within said housing, means for normally retaining said latch out of engagement with said hasp, and a latch-controlling device actuated by said rotating means for automatically reciprocating said latch into engagement with said hasp continuously during the rotation of the basket.

3. In a centrifugal extractor, the combination with a casing, of a cover for said casing, a rotating basket within said casing, means for rotating said basket, a reciprocating latch mounted upon said casing for locking said cover closed, a spring for disengaging said latch from said cover, a latch-controlling device actuated by said rotating means, and means operatively connecting said device with said latch to reciprocate the same against the tension of said spring into locked engagement with said cover continuously during the rotation of the basket.

4. In a centrifugal extractor, the combination with a casing, of a cover for said casing, a rotary basket within said casing, means for rotating said basket, a reciprocating latch mounted upon said casing for locking and unlocking said cover, a spring for disengaging said latch from said cover, means for automatically reciprocating said latch against the tension of said spring into locked engagement with said cover continuously actuated by a movable part during the rotation of said basket, and means for automatically reciprocating said latch to unlock said cover when the rotation of said basket has discontinued.

5. In a centrifugal extractor, the combination with a casing, of a cover for said casing, a movable member within said casing, driving means for operating said member, a latch for locking said cover closed, centrifugal weights rotated by said driving means, an element located in the radial path of said weights, and means connecting said element with said latch to actuate the same to lock said cover closed during the rotation of said driving means.

6. In a centrifugal extractor, the combination with a casing, of a cover for said casing, a movable member within said casing, driving means for operating said member, a latch for locking said cover closed, centrifugal weights rotated by said driving means, a movable band surrounding said weights and adapted to be engaged by them, means operatively connecting said band with said latch for actuating the same to lock said cover closed during the operation of said driving means.

7. In a centrifugal extractor, the combination with a casing, of a cover for said casing, a movable member within said casing, driving means for operating said member, a latch for locking said cover closed, a spring for moving said latch into position to unlock said cover, centrifugal weights rotated by said driving means, a movable band surrounding said weights adapted to be engaged by them, and a connection between said band and latch for moving said latch against the tension of said spring into locked engagement with said cover when said band is moved by said weights into a concentric position, said spring moving said band into an eccentric position relatively to said weights when said latch unlocks said cover.

8. In a centrifugal extractor, the combination with a casing, of a cover for said casing, a movable member within said casing, driving means for operating said member, a reciprocating latch mounted upon said casing and adapted to engage said cover, a spring for disengaging said latch from said cover, centrifugal weights rotated by said driving means, a band surrounding said weights and adapted to be engaged by them, a flexible connection extending from said latch to said band, and means for supporting and guiding said flexible connection.

9. In a centrifugal extractor, the combination with a casing, of a cover for said casing, a basket within said casing, a shaft upon which said basket is secured, means for rotating said shaft, a hasp secured to said cover adapted to overlie said casing when said cover is closed, a latch mounted upon said casing for engaging and disengaging said hasp to lock or unlock said cover, centrifugal weights carried by said shaft, a band surrounding said weights and adapted to be moved by them to a position concentric with respect to said shaft, and a flexible connection between said band and latch, whereby when said band is actuated by said weights said latch will lock said cover closed.

10. In a centrifugal extractor, the combination with a casing, of a cover for said casing, a basket within said casing, a shaft upon which said basket is secured, means for rotating said shaft, a hasp secured to said cover adapted to overlie said casing when said cover is closed, a latch mounted upon said casing for engaging and disengaging said hasp to lock or unlock said cover, centrifugal weights carried by said shaft, a pair of disks secured to said shaft above and below said weights, a band surrounding said weights and guided between said disks, a flexible connection extending from said latch to said band, and a spring for moving said latch to unlock said cover and simultaneously move said band into an eccentric position relatively to said shaft, said spring being compressed and said latch engaged with said cover when said band is moved by said weights to a position concentrically around said shaft.

11. In a centrifugal extractor, the combination with a casing, of a cover for said casing, a basket within said casing, a shaft upon which said basket is secured, means for rotating said shaft, a housing mounted upon said casing, a latch inclosed by said housing and adapted to engage and disengage said cover to lock or unlock the same, centrifugal weights carried by said shaft, a flexible connection between said latch and weights, and a tubular guide inclosing said flexible connection and extending from said housing to a point adjacent said weights.

12. In a centrifugal extractor, the combination with a casing, of a cover for said casing, a basket within said casing, a shaft upon which said basket is secured, means for rotating said shaft, a housing mounted upon said casing, a latch inclosed by said housing and adapted to engage and disengage said cover to lock or unlock the same, centrifugal weights carried by said shaft, a flexible connection between said latch and weights, a tubular guide inclosing said flexible connection and extending from said housing to a point adjacent said weights, and a yieldingly supported plate to which the lower end of said guide is secured.

13. In a centrifugal extractor, the combination with a casing, of a cover for said casing, a basket within said casing, driving means for rotating said basket, a plurality of elements rotated by said driving means during the rotation of the basket, and a movable member controlling the opening of said cover and having a path of movement to permit the cover to open in a plane intersecting the path of rotation of said elements, whereby said member is prevented by the rapid contact therewith of said elements from being moved in a direction to permit the cover to be opened.

In testimony whereof, I have subscribed my name.

FRITZ BALZER.

Witnesses:
　Geo. L. Wilkinson,
　Henry A. Parks.